(12) United States Patent
Huyghe

(10) Patent No.: US 8,291,953 B2
(45) Date of Patent: *Oct. 23, 2012

(54) TIRE WITH LOWER REGION COMPRISING A BIELASTIC REINFORCING ELEMENT

(75) Inventor: Jean-Michel Huyghe, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 889 days.

This patent is subject to a terminal disclaimer.

(21) Appl. No.: 12/302,276

(22) PCT Filed: May 14, 2007

(86) PCT No.: PCT/EP2007/004258
§ 371 (c)(1),
(2), (4) Date: Nov. 24, 2008

(87) PCT Pub. No.: WO2007/134744
PCT Pub. Date: Nov. 29, 2007

(65) Prior Publication Data
US 2009/0183815 A1  Jul. 23, 2009

(30) Foreign Application Priority Data

May 22, 2006  (FR) .................................... 06 04645

(51) Int. Cl.
*B60C 9/00* (2006.01)
(52) U.S. Cl. .......................... 152/563; 152/552; 152/554
(58) Field of Classification Search ............... 152/552, 152/554, 563
See application file for complete search history.

(56) References Cited

U.S. PATENT DOCUMENTS

| | | | | | |
|---|---|---|---|---|---|
| 2,947,340 | A | * | 8/1960 | French | 152/543 |
| 2,985,217 | A | * | 5/1961 | Kuhlman, Jr. | 152/543 |
| 3,460,599 | A | * | 8/1969 | Leach | 152/458 |
| 3,888,292 | A | * | 6/1975 | Menell et al. | 152/542 |
| 4,024,901 | A | * | 5/1977 | Poque | 152/541 |
| 4,129,162 | A | * | 12/1978 | DeWitt | 152/527 |
| 4,708,187 | A | * | 11/1987 | Schmidt et al. | 152/530 |
| 4,896,709 | A | * | 1/1990 | Alie et al. | 152/543 |
| 5,626,698 | A | * | 5/1997 | Tsuruta et al. | 152/541 |
| 6,622,765 | B1 | * | 9/2003 | Corsi | 152/539 |
| 6,659,148 | B1 | * | 12/2003 | Alie et al. | 152/539 |
| 7,017,635 | B2 | * | 3/2006 | Losey | 152/539 |
| 2007/0251627 | A1 | * | 11/2007 | Wright | 152/555 |

FOREIGN PATENT DOCUMENTS

| | | |
|---|---|---|
| FR | 2 864 470 | 7/2005 |
| JP | 59 063207 | 4/1984 |
| WO | WO 2005063510 A1 * | 7/2005 |

\* cited by examiner

*Primary Examiner* — Joseph Del Sole
*Assistant Examiner* — David N Brown, II
(74) *Attorney, Agent, or Firm* — Cozen O'Connor

(57) ABSTRACT

Tire comprising at least one carcass-type reinforcing structure (6) anchored on each side of the tire. The anchoring includes a turning up of the carcass-type reinforcing structure around a bead core (15) in such a way as to form a turned-up section (8). The tire also includes at least one circumferential bielastic reinforcing element (10) made of a bielastic fabric, in which the fabric employed is a bielastic knitted fabric, that is a stitched fabric in which the loops forming the stitches are capable of moving relative to each other. The at least one bielastic reinforcing element (10) being arranged so as to extend substantially parallel along a portion of the reinforcing structure (6) which is situated in that region of the bead (4) of the tire that is axially outward relative to the reinforcing structure, in the immediate vicinity of the latter.

12 Claims, 2 Drawing Sheets

TIRE WITH LOWER REGION COMPRISING A BIELASTIC REINFORCING ELEMENT

RELATED APPLICATIONS

This is a U.S. National Phase Application under 35 USC 371 of International Application PCT/EP2007/004258, filed on May 14, 2007.

This application claims the priority of French patent application no. 06/04645 filed May 22, 2006, the subject matter of which is hereby incorporated by reference.

FIELD OF THE INVENTION

The invention relates to a tire comprising at least one circumferential bielastic reinforcing element made of a bielastic fabric.

BACKGROUND OF THE INVENTION

As is well known, tires are incessantly subjected to numerous mechanical stresses arising from varying causes dependent in particular on the type of vehicle, the driver's driving style, the type of route taken, the general condition of the roads on which the vehicle is traveling, and so forth. Each of these parameters has an impact, direct or indirect, on the type and severity of mechanical stresses and strains imposed on the tire in the course of its use. Furthermore, the lower region of the tire is particularly affected by these phenomena because this region concentrates many of the stresses, particularly because of the presence of the hook of the rim, which, being in direct contact with the lower region of the tire, produces a stress concentration region.

SUMMARY OF THE INVENTION

A first apsect of the invention is directed to a tire comprising at least one carcass-type reinforcing structure extending circumferentially from a bead to a sidewall and anchored on each side of the tire in a bead, the base of which latter is designed to be mounted on a wheel rim seat, said anchoring comprising a turning-up of said carcass-type reinforcing structure around a bead core in such a way as to form, along a radially inward portion of the bead core, a turning-up portion of the reinforcing structure from a point axially inside the bead core to a point axially outside the bead core, and then extending radially outwardly from the base of said bead core in such a way as to form a turned-up section ending in an end, each bead being continued radially outwardly by a sidewall, the sidewalls meeting, in the radially outward direction, a tread, said tire also comprising at least one circumferential bielastic reinforcing element made of a bielastic fabric, in which the fabric employed is a bielastic knitted fabric, that is a stitched fabric, the loops forming the stitches of which are capable of moving relative to each other in the knitting direction and in the direction perpendicular to the knitting, said at least one bielastic reinforcing element being arranged so as to extend substantially parallel along a portion of the reinforcing structure which is situated in that region of the bead of the tire that is axially outward relative to the reinforcing structure, in the immediate vicinity of the latter (that is, at a shorter distance from the axially inner portion of the reinforcing structure than from the turned-up section of said reinforcing structure). By means of such an application of the bielastic reinforcing element, the mechanical properties of the tire, such as its durability and impact resistance, are improved.

The bielastic reinforcing element creates an effect of energy absorption and diffusion which is beneficial to these properties.

The use of a bielastic reinforcing element improves the crack propagation resistance. The durability and service life of the products can thus be improved. This form of architecture is particularly advantageous in the case of tires for passenger cars, these tires being liable to be severely stressed in certain types of use, such as high-speed cornering and/or in certain types of hostile environment, when the lower region comes under severe strains. The present invention reduces the harmful effects of such strains.

According to an advantageous embodiment, said bielastic reinforcement extends radially inwardly, from a radial position corresponding to the position of the end of the turned-up section of the reinforcing structure, over more than half of the radial distance between said end and the radially outward portion of the bead core.

Said bielastic reinforcement preferably extends radially inwardly, from a radial position corresponding to the position of the end of the turned-up section of the reinforcing structure, over more than 70% (and still more preferably more than 85%) of the radial distance between said end and the radially outward portion of the bead core. According to an example of an advantageous embodiment, the bielastic reinforcement extends radially inwardly from a minimum five mm from the end of the carcass-type reinforcing structure (distance D2). In these different examples of embodiments, the bielastic reinforcing element is thus positioned as a priority along the portion of the carcass-type reinforcing structure which is highly stressed and where an effect of energy diffusion is particularly beneficial.

According to an advantageous embodiment, that portion of the bead which lies between the two converging sections of reinforcing structures forms a filler region occupied by a rubber filler material in which the whole of the bielastic reinforcing element is contained. According to an example of an advantageous embodiment, the radially outward end of the bielastic reinforcing element is situated at least five mm from the radially upper limit of the filler region (distance D1). Because of its high modulus, the rubber filler material provides good anchoring properties. On the other hand, this type of material is more fragile. The presence of the bielastic reinforcing element allows to attenuate or compensate for this latter effect because there is a mechanical decoupling of the carcass-type reinforcing structure from the filler region. According to an advantageous embodiment, the materials of the filler region exhibit a higher modulus than that on either side of this region.

According to another embodiment of the invention, said bielastic reinforcing element is continued radially inwardly in such a way as to form, along a radially inward portion of the bead core, a turning-up portion of the bielastic reinforcing element, from a point axially inside the bead core to a point axially outside the latter, and then extending radially outwardly from the base of said bead core to a radial position less than or equal to that of the end of the turned-up section of the reinforcing structure.

According to other embodiments, the turning up portion of the bielastic reinforcing element extends radially out from the base of said bead core to a radially higher position than that of the end of the turned-up section of the reinforcing structure.

According to a variant, that end of the bielastic reinforcing element which is situated towards the turned-up section of the carcass-type reinforcing structure is situated in the filler region. According to an example of an advantageous embodiment, this end is situated at least five mm from the free end of the turned-up section of the carcass-type reinforcing structure (distance D3). According to these examples of embodiments, the entire stressed portion of the anchoring region is protected by the presence of the bielastic reinforcing element.

The filler region extends preferably radially outwardly past the end of the turned-up section of the reinforcing structure.

Advantageously, the bielastic reinforcing element has at least one and preferably all of the following properties:
- an elastic elongation ratio of at least 8%, and
- a stitch size of less than or equal to 150 stitches per decimeter, and preferably 200 stitches per decimeter.

The bielastic reinforcing element preferably comprises at least one material selected from polyamides, polyesters, rayon, cotton, wool, aramid, silk and flax.

Advantageously, the bielastic reinforcing element comprises a certain proportion of elastic threads.

Also advantageously, the bielastic reinforcing element has a thickness between 0.2 mm and 2 mm, and preferably between 0.4 and 1.2 mm.

The bielastic reinforcing element has a mass per unit area of preferably generally between 70 and 700 $g/m^2$, and still more preferably between 140 and 410 $g/m^2$.

According to another advantageous embodiment, the bielastic reinforcing element is composed of at least one polymer selected from thermosetting polymers and thermoplastic polymers.

The fabric employed is advantageously a bielastic knitted fabric, that is to say a stitched fabric, the loops forming the stitches of which are capable of moving relative to each other in the knitting direction and in the direction perpendicular to the knitting. "Bielastic" is used here to indicate that the material in question possesses properties making it elastic in at least two substantially perpendicular directions, and preferably in all directions.

It is not essential to use elastomeric fibers to produce this fabric or knitted fabric. A small proportion of such fibers may be used to facilitate the application and promote the elastic return.

If however a purely mechanical decoupling is all that is desired, the use of an elastomeric matrix may make it possible to amplify the decoupling ability.

The expression "bielastic fabric" also covers structures that can deform elastically reversibly but which are not necessarily knitted. They may in particular be structures obtained by crocheting, or looped or needle-punched assemblies.

The interlacing of the loops forms a network that is elastically deformable in two substantially perpendicular directions. In the advantageous case in which a bielastic knitted fabric is being used, the deformability of this bielastic knitted fabric according to the invention is particularly due to the knitted structure, as the fibers of the knitted fabric slide over one another in the looped network. Generally speaking, the elastic elongation ratio of the bielastic knitted fabric according to the invention is at least 10% in at least one of the two directions of elongation. It is advantageously 50% or more, or even more particularly 100% or more. It will be understood that these are the properties before the incorporation of the knitted fabric into the tire according to the invention.

The direction in which the bielastic knitted fabric is laid on the regions to be protected is advantageously such that the direction in which the knitted fabric has the greatest elongation ratio is parallel to the direction of the highest strain acting on said region.

BRIEF DESCRIPTION OF THE DRAWINGS

Other features and advantages of the invention will become apparent on reading one example of embodiment of a tire in accordance with the invention, with reference to the attached figures, in which.

DETAILED DESCRIPTION OF THE DRAWINGS

In this document the term "axial" means a direction parallel to the axis of rotation of the tire; this direction may be "axially inward" when directed into the tire, and "axially outward" when directed towards the outside of the tire.

The expression "crown reinforcing structure" is used in the text. In the usual way, this element is often referred to as the "crown reinforcement".

Figure 1:
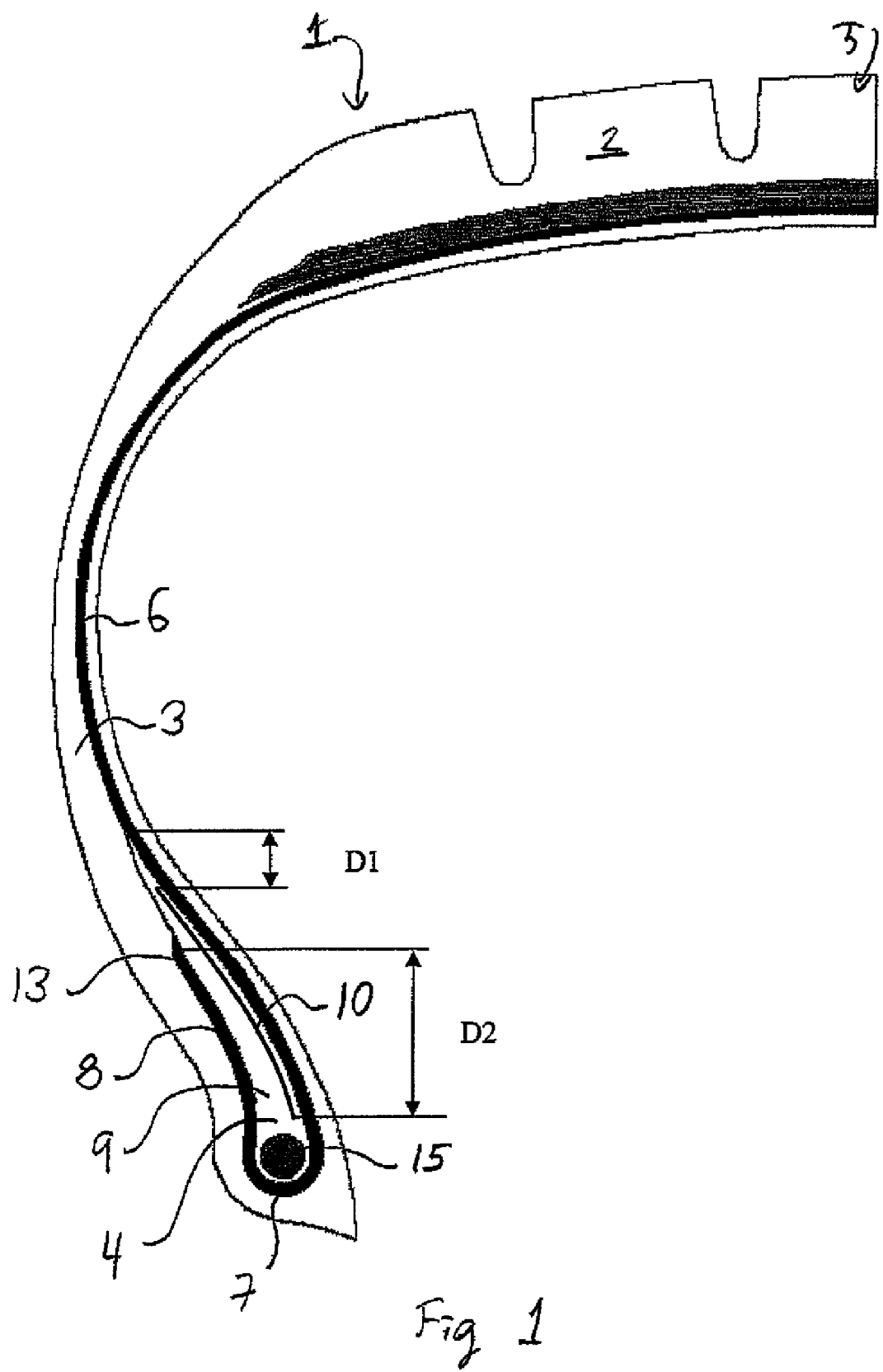
FIG. 1 is a transverse cross section through one half of a tire, with a sidewall and a portion of the crown, with a first example of the positioning of a bielastic reinforcing element.

FIG. 1 shows diagrammatically a radial half-section through a tire 1 with a carcass reinforcement. This tire 1 comprises a crown 2, sidewalls 3, beads 4, and a carcass-type reinforcing structure 6 extending preferably from one bead to the other. On top of the crown 2 is a tread 5. The reinforcing structures 6 are anchored in the bead in the conventional way, by wrapping them around a bead core 15. This form of anchoring comprises a turn-up of said carcass-type reinforcing structure 6 around a bead core 15 in such a way as to form, along a radially inward portion of the bead core, a turning-up portion 7 of the reinforcing structure from a point axially inside the bead core to a point axially outside the bead core, and then extending radially out from the base of said bead core in such a way as to form a turned-up section 8 ending in an end 13.

At least one bielastic reinforcing element 10 is arranged in the vicinity of said carcass-type reinforcing structure. In FIG. 1, the element 10 is positioned, on the one hand axially outwards of the reinforcing structure 6, and on the other hand, in the radially inward portion of the sidewall, next to the bead 4.

The almost closed loop formed by the turn-up of the carcass-type reinforcing structure 6 around the bead core 15 is preferably filled by a rubber filler material 9 whose modulus is higher than that of the material occupying the outer portion of this same loop. This filler region is defined radially inwardly by the bead core 15, laterally by the axially inward and axially outward portions of the carcass-type reinforcing structure, and radially outwardly by the end 13 of the turned-up section 8 of the turned-up section of the carcass-type reinforcing structure. In the examples shown in FIGS. 1 and 2, the filler region continues past the end 13, connecting the latter to a point radially outward of the reinforcing structure 6. The bielastic reinforcing element 10 is preferably situated in this filler region 9. Still more preferably, the element 10 is entirely contained within this region 9. In the example shown in FIG. 1, the radially outward end of the reinforcing element 10 is at a minimum distance of five mm (distance D1) from the radially outward end of the filler region 9.

The bielastic reinforcing element 10 extends radially inwardly from the end 13 for at least half the radial distance between said point 13 and the radially outward portion of the bead core 15. According to other advantageous variants, the bielastic reinforcing element 10 extends radially inwardly from the point 13 for at least 70%, and still more preferably over more than 85%, of the radial distance between said point 13 and the radially outward portion of the bead core 15.

Figure 2:
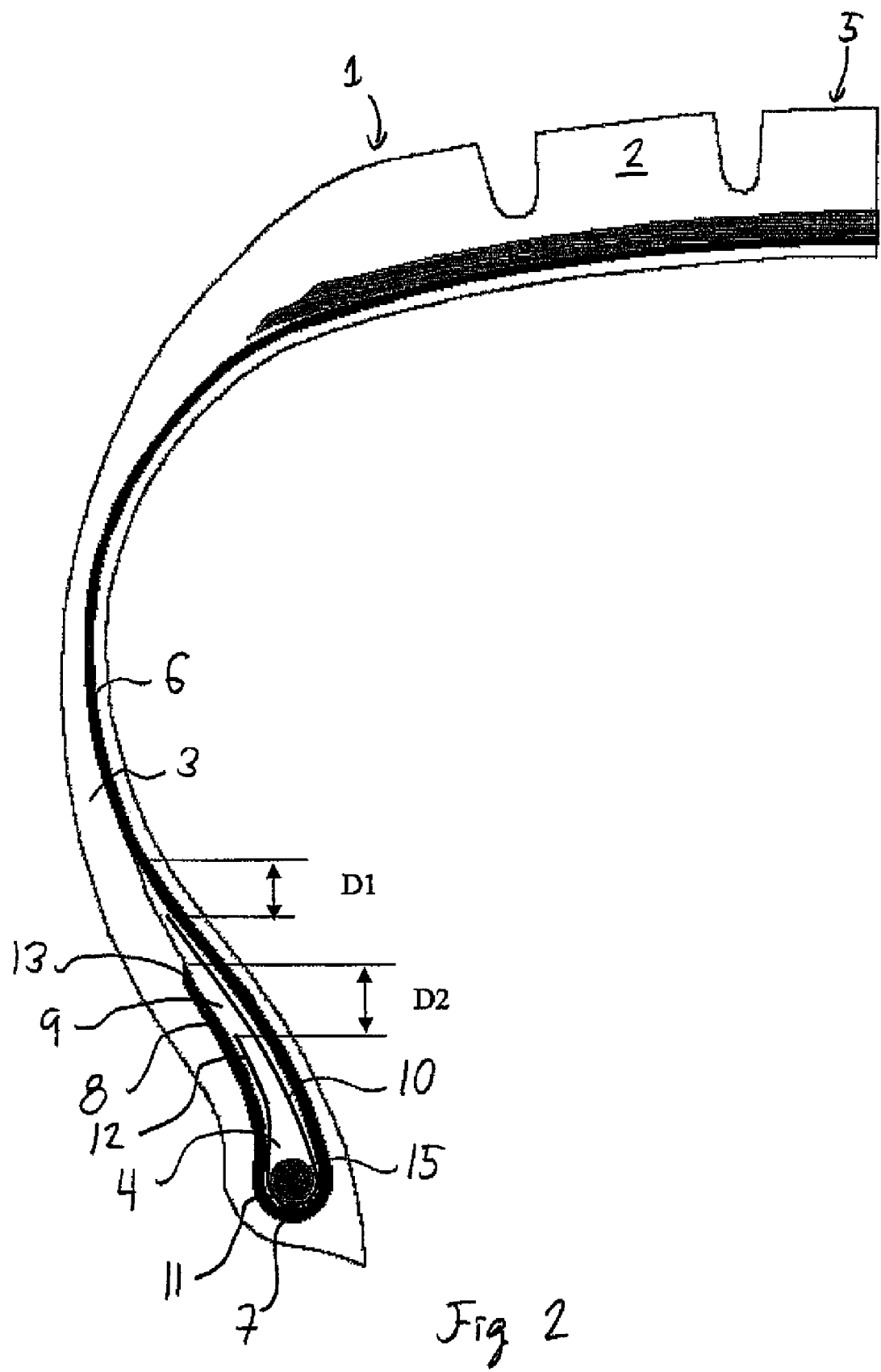
FIG. 2 is a cross section similar to that of FIG. 1, with a second example of the positioning of a bielastic reinforcing element.

FIG. 2 shows another example of embodiment in which the arrangement of the reinforcing element differs from the first example of embodiment.

Specifically, in the example of FIG. 2, the bielastic reinforcing element 10 is continued radially inwardly in such a way as to form, along a radially inward portion of the bead core 15, a turning-up portion 11 of the bielastic reinforcing element, from a point axially inside the bead core to a point axially outside the latter, and then extending radially outwardly from the base of said bead core 15 to a radial position less than or equal to that of the end 13 of the turned-up section 8 of the carcass-type reinforcing structure, forming a turned-up portion 12 of the bielastic reinforcing element.

The end of the turned-up portion 12 lies in the filler region 9. This end is preferably situated at a distance D3 equal to or greater than 5 mm from the end 13 of the turned-up section 8 of the carcass-type reinforcing structure.

The reinforcing element 10 is advantageously made of a highly deformable elastic knitted fabric of low apparent density. This permits elasticity by allowing the threads to slide and the stitches to deform. It permits a certain measure of mechanical decoupling between the various architectural components between which it is interposed. Also, the advantage of an elastic knitted fabric is clearly that is has sufficient structural flexibility to follow the deformations of the tire. Different types of material can thus be selected to form this elastic knitted fabric: its thickness, void volume and density are directly related to this selection and to the knitted structure (thread diameter, number of stitches per dm, and tightness).

The bielastic fabric has at least one and preferably all of the following properties:
  an elastic elongation ratio of at least 8%, and
  a stitch size of less than or equal to 150 stitches per decimeter, and preferably 200 stitches per decimeter.

For example, tests performed on a knitted fabric comprising 240 stitches per decimeter on one side and 235 stitches per decimeter on the other gave highly promising results, particularly in terms of crack resistance.

The bielastic knitted fabric of the invention is generally made of synthetic fibers, natural fibers, or a blend of these fibers. In terms of synthetic fibers, the bielastic knitted fabric of the invention may comprise at least one type of fibers selected from polyamide 6, polyamide 6, 6 (nylon), polyesters, etc.

Said fabric thus advantageously comprises at least one material selected from polyamides, polyesters, rayon, cotton, wool, aramid, silk and flax.

According to an advantageous variant, a certain proportion of elastic threads such as polyurethane, latex, and natural or synthetic rubber threads can be useful to provide the elastic return, thus facilitating the application of the fabric. Thus, one bielastic knitted fabric according to the invention that may be mentioned is the knitted fabric sold by Milliken under reference 2700 composed of 82% of polyamide 6 fibre and 18% of 44 dTex polyurethane.

The bielastic fabric or knitted fabric according to the invention has a thickness between 0.2 mm and 2 mm, and preferably between 0.4 and 1.2 mm.

Its mass per unit area is generally between 70 and 700 g/m$^2$, and preferably between 140 and 410 g/m$^2$.

According to a variant, the bielastic knitted fabric is composed of at least one polymer selected from thermosetting polymers and thermoplastic polymers.

The elastic knitted fabric may preferably have a density of at least 0.02 g/cm$^3$, measured by conventional means, this density being optionally up to 0.50 g/cm$^3$.

Another feature of the elastic knitted fabric useable in the context of the invention is its void volume. Typically, according to the invention, the void volume will advantageously be at least 40% to ensure that the knitted fabric is sufficiently compressible. This void volume can be calculated by comparing the density of the knitted fabric with that of the compact material forming its matrix, measured by any conventional means.

Of the non-elastomeric materials that may be used to form the matrix of these knitted fabrics, the following may be cited:
  natural textile fibers, such as cotton, wool, flax, hemp, silk, etc.;
  artificial textile fibers such as rayon;
  synthetic textile fibers of for example polyesters, polyamides, aramids, polyvinyl chloride, polyolefins etc.;
  mineral fibers of for example glass, silica or mineral wool.

As elastomeric materials one may cite include natural rubber, polybutadiene, SBR, polyurethane, etc.

The invention claimed is:

1. A tire comprising at least one carcass-type reinforcing structure extending circumferentially from a bead to a sidewall and anchored on each side of the tire in a bead, the base of which latter is designed to be mounted on a wheel rim seat, said anchoring comprising a turning up of said carcass-type reinforcing structure around a bead core in such a way as to form, along a radially inward portion of the bead core, a turning-up portion of the reinforcing structure from a point axially inside the bead core to a point axially outside the bead core, and then extending radially outwardly from the base of said bead core in such a way as to form a turned-up section ending in an end, each bead being continued radially outwardly by a sidewall, the sidewalls meeting, in the radially outward direction, a tread, said tire also comprising at least one circumferential bielastic reinforcing element made of a bielastic fabric, in which the fabric employed is a bielastic knitted fabric, that is a stitched fabric, the loops forming the stitches of which are capable of moving relative to each other in the knitting direction and in the direction perpendicular to the knitting, said at least one bielastic reinforcing element being arranged so as to extend substantially parallel along a portion of the reinforcing structure which is situated in that region of the bead of the tire that is axially outward relative to the reinforcing structure, in the vicinity of the latter, wherein said bielastic reinforcement extends radially inwardly, from a radial position corresponding to the position of the end of the turned-up section of the reinforcing structure, over more than half of the radial distance between said end and the radially outward portion of the bead core.

2. The tire of claim 1, wherein said bielastic reinforcement extends radially inwardly, from a radial position corresponding to the position of the end of the turned-up section of the reinforcing structure, over more than 70% of the radial distance between said end and the radially outward portion of the bead core.

3. The tire of claim 1, wherein that portion of the bead which lies between the two converging sections of reinforcing structures forms a filler region occupied by a rubber filler material in which the whole of the bielastic reinforcing element is contained.

4. The tire of claim 1, wherein said bielastic reinforcing element is continued radially inwardly in such a way as to form, along a radially inward portion of the bead core, a turning-up portion of the bielastic reinforcing element, from a point axially inside the bead core to a point axially outside the latter, and then extending radially outwardly from the base of said bead core to a radial position less than or equal to that of the end of the turned-up section of the reinforcing structure.

5. The tire of claim 3, wherein that end of the bielastic reinforcing element which is situated towards the turned-up section of the carcass-type reinforcing structure is situated in the filler region.

6. The tire of claim 4, wherein the filler region extends radially outwardly past the end of the turned-up section of the reinforcing structure.

7. The tire of claim 1, wherein the bielastic reinforcing element has at least one of the following properties:
   an elastic elongation ratio of at least 8%, and
   a stitch size of less than or equal to 150 stitches per decimeter, and preferably 200 stitches per decimeter.

8. The tire of claim 1, wherein said bielastic reinforcing element comprises at least one material selected from polyamides, polyesters, rayon, cotton, wool, aramid, silk and flax.

9. The tire of claim 1, wherein the bielastic reinforcing element comprises a certain proportion of elastic threads.

10. The tire of claim 1, wherein the bielastic reinforcing element has a thickness between 0.2 mm and 2 mm.

11. The tire of claim 1, wherein the bielastic reinforcing element has a mass per unit area of generally between 70 and 700 g/m$^2$.

12. The tire of claim 1, wherein the bielastic reinforcing element is composed of at least one polymer selected from thermosetting polymers and thermoplastic polymers.

* * * * *